(12) United States Patent
Shi

(10) Patent No.: US 7,359,940 B2
(45) Date of Patent: *Apr. 15, 2008

(54) COOPERATIVE PROCESSING APPARATUS AND COOPERATIVE PROCESSING METHOD

(75) Inventor: Meng Shi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 676 days.

This patent is subject to a terminal disclaimer.

(21) Appl. No.: 10/661,646

(22) Filed: Sep. 15, 2003

(65) Prior Publication Data
US 2004/0194012 A1 Sep. 30, 2004

(30) Foreign Application Priority Data
Mar. 24, 2003 (JP) ............................. 2003-081196

(51) Int. Cl.
*G06F 15/16* (2006.01)
(52) U.S. Cl. ...................... 709/205; 709/220; 709/223
(58) Field of Classification Search ............... 709/205, 709/220, 223
See application file for complete search history.

(56) References Cited

U.S. PATENT DOCUMENTS

| | | | |
|---|---|---|---|
| 6,747,751 B2 * | 6/2004 | Nishikata et al. .......... | 358/1.13 |
| 6,804,020 B1 * | 10/2004 | Kuroda ...................... | 358/1.15 |
| 2003/0048492 A1 * | 3/2003 | Maeda et al. ............... | 358/486 |
| 2003/0050971 A1 * | 3/2003 | Okuyama et al. .......... | 709/203 |
| 2004/0163033 A1 * | 8/2004 | Wolfe et al. ................ | 715/500 |

FOREIGN PATENT DOCUMENTS

| | | |
|---|---|---|
| JP | A-09-325928 | 12/1997 |
| JP | A 10-505693 | 6/1998 |
| JP | A 11-175421 | 7/1999 |
| JP | A 2000-29847 | 1/2000 |
| JP | A 2000-250672 | 9/2000 |
| JP | A-2001-273272 | 10/2001 |
| JP | A 2001-306534 | 11/2001 |
| JP | A 2002-528932 | 9/2002 |

OTHER PUBLICATIONS

English-language translation of Japanese Office Action, dated Oct. 23, 2007.

* cited by examiner

*Primary Examiner*—Saleh Najjar
*Assistant Examiner*—Nghi Tran
(74) *Attorney, Agent, or Firm*—Oliff & Berridge, PLC

(57) ABSTRACT

When instruction data is received, a prescribed service is performed on the basis of the received instruction data. A processing result of the service is sent to a service processing apparatus as an instruction data transmission source. If the processing result of the service is normal, the instruction data is copied. One instruction data is sent to a service processing apparatus that is to performing a next service on the basis of a description in the instruction data, and the other instruction data is stored. If it is judged that an abnormality has occurred in the service processing apparatus as the instruction data transmission destination, the stored instruction data is sent to a service processing apparatus capable of performing a substitute service for the next service.

10 Claims, 10 Drawing Sheets

TRANSMISSION OF NORMAL TERMINATION NOTICE

TRANSMISSION OF ABNORMAL TERMINATION NOTICE OR NON-ARRIVAL OF RESULT NOTICE

COOPERATIVE PROCESSING APPARATUS AND COOPERATIVE PROCESSING METHOD

BACKGROUND OF THE INVENTION

1. Field of the Invention

The present invention relates to a cooperative processing apparatus and a cooperative processing method. In particular, the invention relates to a cooperative processing apparatus and a cooperative processing method that are suitable for use in a document processing network system in which various apparatus are connected to each other via a network and a document is processed through cooperative use of services provided by respective apparatus.

2. Description of the Related Art

Various techniques are known that relate to distributed processing systems that execute a series of processing steps by using, in a cooperative manner, programs and services (functions) that are distributed via a network.

For example, a system is known that enables interactive operation of objects of two or more different kinds of object systems in a digital computer and can generate a larger-size object-oriented software project by combining those objects (e.g., JP-T-10-505693 (the symbol "JP-T" as used herein means a published Japanese translation of a PCT patent application)). Also known is an apparatus that provides a real-time event processing service at each of service nodes that are distributed in the entire intelligent network (e.g., JP-T-2002-528932).

Techniques relating to distributed processing systems in which agents that operate independently cooperate to perform a series of work steps are known. Among those is a technique in which, in an agent system in which information is processed in such a manner that an agent operates through a network having multiple platforms, an agent action plan is drawn up according to situations and whether the agent should make an inter-node movement or cooperate with another agent to perform processing at another node is determined dynamically according to conditions, whereby information is processed efficiently while adaptation is made to variations (e.g., JP-A-2000-29847). Also known in a message delivery method and an agent apparatus in which a service list is added to a message that is exchanged between pieces of software such as agents that are distributed via a network, the service list being defined by a series of pair data of message destination information and process information specified by the message. A process is executed in such a manner that while a service list portion for which processing has been finished by software at a destination is deleted, the message to which the service list is added is delivered from one pieces of software to another (e.g., JP-A-11-175421).

A network cooperation apparatus is also known in which cooperative processing data are transmitted between cooperative apparatus in order of processing in a case that a cooperative process is executed in such a manner that input/output functions and programs that operate on apparatus connected to a network are combined in accordance with how each user uses them (e.g., JP-A-2001-306534).

On the other hand, in the office environment, distributed processing type document processing network systems are employed increasingly in which scanners, facsimile machines, copiers, composite machines thereof, personal computers, mail servers, etc. are connected to each other via a network and document data is processed through cooperative use of services provided by those apparatus. Among those document processing network systems are systems that intensively manage cooperation between services distributed via a network using a server and systems in which a cooperative process is executed without use of a server in such a manner that cooperation information including cooperative relationships between services and input/output information is transmitted in order between apparatus that provide the services.

However, in document processing network systems that do not use a server, cooperation between services cannot be managed intensively. This results in a problem that if a failure occurs during execution of a cooperative process, cooperation information disappears in an apparatus or a communication channel where the failure has occurred and the process is suspended. In the above-described conventional techniques, no consideration is given to a case that a failure occurs during execution of a cooperative process.

SUMMARY OF THE INVENTION

The present invention has been made in view of the above circumstances, and provides a cooperative processing apparatus and a cooperative processing method capable of continuing a cooperative process by transmitting cooperation information with high reliability even if an obstacle (e.g., failure) is encountered during execution of the cooperative process.

The invention provides a cooperative processing apparatus including sending and receiving unit for sending and receiving cooperation information to be used for executing a prescribed flow of services on document data in a cooperative manner and a processing result of a service to and from other cooperative processing apparatus; service processing unit for performing a prescribed service; and control unit for performing a first control of controlling, when receiving cooperation information, the service processing unit so that it performs the prescribed service on the basis of the cooperation information; a second control of sending, to a transmission source of the cooperation information, a processing result indicating whether the service processing unit has performed the prescribed service normally or abnormally, and, if the service processing unit has performed the prescribed service normally, copying the cooperation information and controlling the sending and receiving unit so that it sends one piece of cooperation information to a cooperative processing apparatus that is to perform a next service on the basis of the cooperation information; and a third control of controlling the sending and receiving unit so that it sends the other piece of cooperation information to a cooperative processing apparatus capable of performing a substitute service for the next service if the control unit judges that an abnormality has occurred in the cooperative processing apparatus in performing the next service after receiving the cooperation information.

The invention also provides a cooperative processing method including a first control step of controlling service processing unit for performing a prescribed service so that it performs the prescribed service on the basis of cooperation information when the cooperation information is received by sending and receiving unit for sending and receiving cooperation information to be used for executing a prescribed flow of services on document data in a cooperative manner and a processing result of a service to and from other cooperative processing apparatus; a second control step of sending, to a transmission source of the cooperation information, a processing result indicating whether the service processing unit has performed the prescribed service normally or abnormally, and, if the service processing unit has performed the prescribed service normally, copying the cooperation information and controlling the sending and receiving unit so that it sends one piece of cooperation information to a cooperative processing apparatus that is to perform a next service on the basis of the cooperation information; and a third control step of controlling the sending and receiving unit so that it sends the other piece of cooperation information to a cooperative processing apparatus capable of performing a substitute service for the next service if judging that an abnormality has occurred in the cooperative processing apparatus in performing the next service after receiving the cooperation information.

BRIEF DESCRIPTION OF THE DRAWINGS

Preferred embodiments of the present invention will be described in detail based on the following figures, wherein.

DESCRIPTION OF THE PREFERRED EMBODIMENT

An embodiment of the present invention will be hereinafter described in detail with reference to the drawings.

Figure 1:
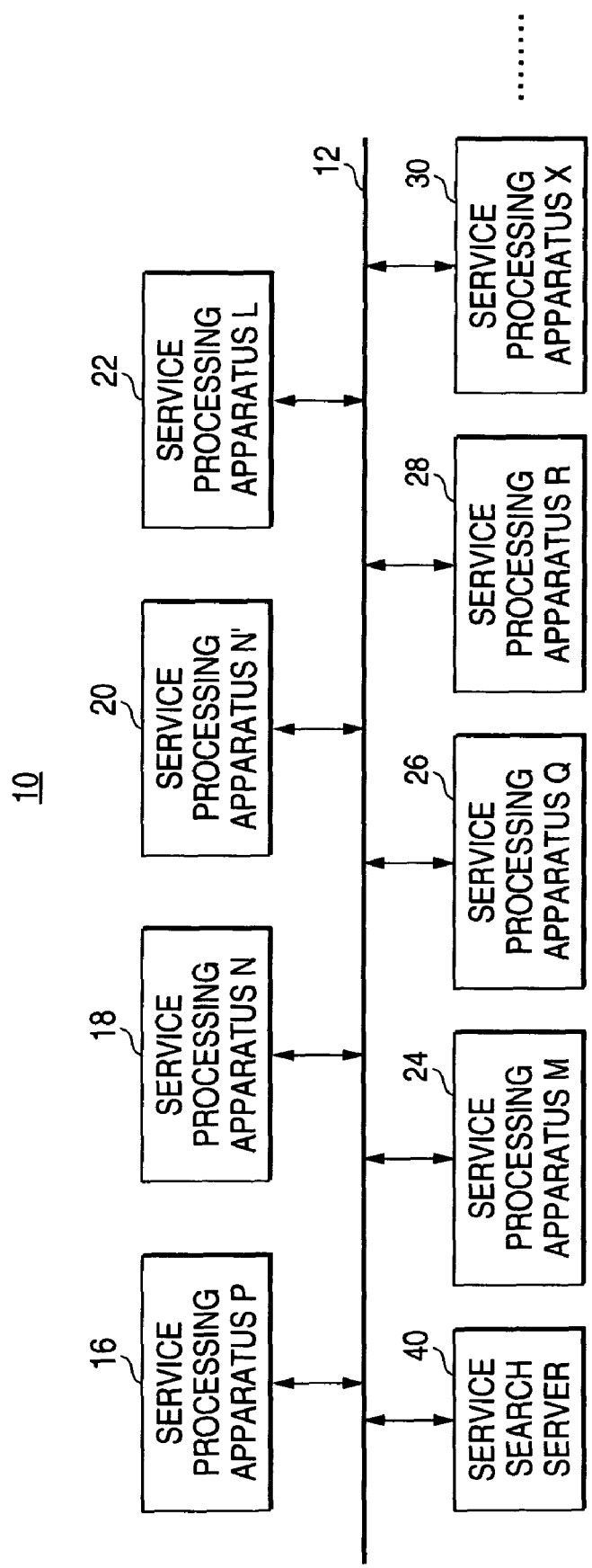
FIG. 1 is a block diagram showing the configuration of a document processing system according to an embodiment of the present invention.

FIG. 1 is a block diagram showing the configuration of a document processing system 10 according to the embodiment of the invention.

In the document processing system 10, various services and applications are connected to each other via a network 12. The term "service" means a usable document-related function and is, for example, copying, printing, scanning, facsimile transmission/reception, mail delivery, OCR (optical character recognition) processing, noise elimination processing, data format conversion, or the like. Even if being of the same kind, services are dealt with as different ones if they are provided by different service processing apparatus (the details of which will be described later).

Specifically, the document processing system 10 is equipped with service processing apparatus P/16, N/18, N'/20, L/22, M/24, Q/26, R/28, and X/30 each of which provides a single or plural services, and a service search server 40 for searching for a desired service.

Although the document processing system 10 according to this embodiment is such that the plural service processing apparatus for performing prescribed services are connected to each other via a network 12, in the invention no limitations are imposed on the system configuration except that plural services should be connected to each other via a network 12.

In the document processing system 10, instruction data (described later in detail) that allows cooperation between services are transmitted in order between service processing apparatus that provide the services together with document data as a subject of processing, whereby services based on the document data are performed in order in the service processing apparatus and, as a result, cooperative processing of a series of services (will be referred to as "job flow" or merely as "flow") is performed. The system 10 does not employ a server for intensively managing the cooperation state of services.

The term "cooperation" means that services have a certain relationship; for example, a result of a certain service determines services to be activated subsequently or influence operation of services to be performed subsequently.

The term "instruction data" means data that is composed of various kinds of information to be used for cooperation of services. More specifically, the instruction data contains information indicating a cooperative relationship between services that constitute a job flow, input/output information of the services, a start time to of the flow, information of a service limit period $t_s$ of each service, and information of a process limit period T of the entire flow.

Further, the instruction data is given a unique ID. The service processing apparatuses P/16 to X/30 can recognize instruction data using its ID.

Figure 2:
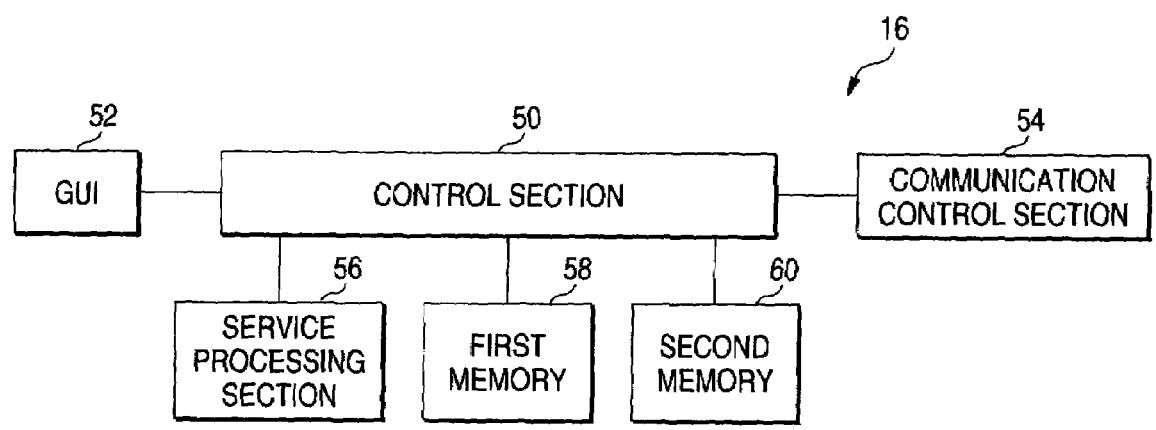
FIG. 2 is a block diagram showing the configuration of a service processing apparatus P.

FIG. 2 is a block diagram showing the configuration of the service processing apparatus P/16. The service processing apparatus P/16 is equipped with a control section 50, to which a graphic user interface (GUI) 52, a communication control section 54, a service processing section 56, a first memory 58, and a second memory 60 are connected.

The control section 50 is a microcomputer that incorporates a CPU and a ROM (both not shown). A program of a cooperative processing routine for exchanging instruction data and document data as a subject of processing with another service processing apparatus and for performing various services on the basis of the instruction data is stored in the ROM of the control section 50. The cooperative processing routine includes two subroutines, that is, an instruction data reception processing routine and an instruction data transmission processing routine. The details of a process that is executed according to this program will be described later. A program of a registration processing routine for registering, in the service search server 40, a service that can be performed by the apparatus P/16 and a program of a cooperative process activation processing routine for selecting instruction data according to a manipulation of a user and activating a cooperative process are also stored in the ROM. The control section 50 performs service registration processing and cooperative process activation processing according to these programs.

Composed of a touch panel and buttons, for example, the GUI 52 displays instruction data and receives a prescribed manipulation of a user.

Connected to the network 12, the communication control section 54 controls a communication with another service processing apparatus or the service search server 40. More specifically, controlled by the control section 50, the communication control section 54 sends and receives instruction data and a service processing result to and from other service processing apparatus, sends a search request of a desired service to the service search server 40, and receives a search result from the service search server 40.

The service processing section 56 performs, according to an instruction from the control section 50, a service that the service processing apparatus P/16 can provide.

Instruction data and document data as a subject of processing are stored in the first memory 58. Stored instruction data and document data as a subject of processing are erased by the control section 50 upon reception of a normal terminationnotice of the next service.

A pre-received instruction data ID list that is a list of IDs of instruction data that have been received by the communication control section 54 is stored in the second memory 60. An ID is deleted from the pre-received instruction data ID list by the control section 50 when a process limit period T of the entire flow of instruction data having the ID has elapsed.

The configurations of the other service processing apparatus N/18 to X/30 are the same as the configuration of the service processing apparatus P/16 and hence will not be described.

Figure 3:
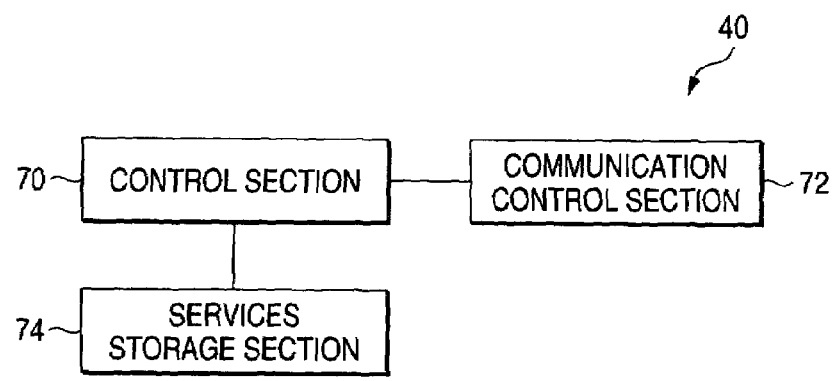
FIG. 3 is a block diagram showing the configuration of a service search server.

According to a request from each service processing apparatus, the service search server 40 register a service that can be performed by each service processing apparatus and searches registered services for a desired one. More specifically, as shown in FIG. 3, the service search server 40 is equipped with a control section 70 and a communication control section 72 and a service storage section 74 that are connected to the control section 70.

Connected to the network 12, the communication control section 72 controls a communication with each service processing apparatus.

Information (e.g., a kind of service, a service name, and position information of an apparatus that performs the service) relating to services whose registration has been requested by the service processing apparatuses P/16 to X/30 and that can be performed by the service processing apparatuses P/16 to X/30 is stored in the service storage section 74.

The control section 70 is a microcomputer including a CPU and a ROM (both not shown). According to programs stored in the ROM, the CPU stores, in the service storage section 74, information relating services that can be performed by a service processing apparatus upon receiving a request from the service processing apparatus. Further, when receiving a request from a service processing apparatus, the CPU searches the service storage section 74 for a desired service and sends a search result to the request source service processing apparatus.

The cooperative process activation routine and the cooperative processing routine of each service processing apparatus will be described below. First, in the cooperative process activation routine, instruction data stored in the memory (not shown) is selected in one of the service processing apparatus P/16 to X/30 which are connected to the network 12 and a cooperative process is started. More specifically, one (or plural) instruction data is selected by a manipulation of a user on the GUI 52 on which a list of instruction data stored in the memory is displayed. When the current time has reached a flow start time $t_0$ that is contained in the selected instruction data, the cooperative process of the flow that is described in the selected instruction data is started. The instruction data is thereafter transmitted in order to services that constitute the flow described in the instruction data. In the following description, a service processing apparatus that has selected instruction data and activated a cooperative process will be called "instruction data activation source."

The service processing routine of each service processing apparatus will be described below in detail with reference to flowcharts of FIGS. 4 and 5.

Figure 4:
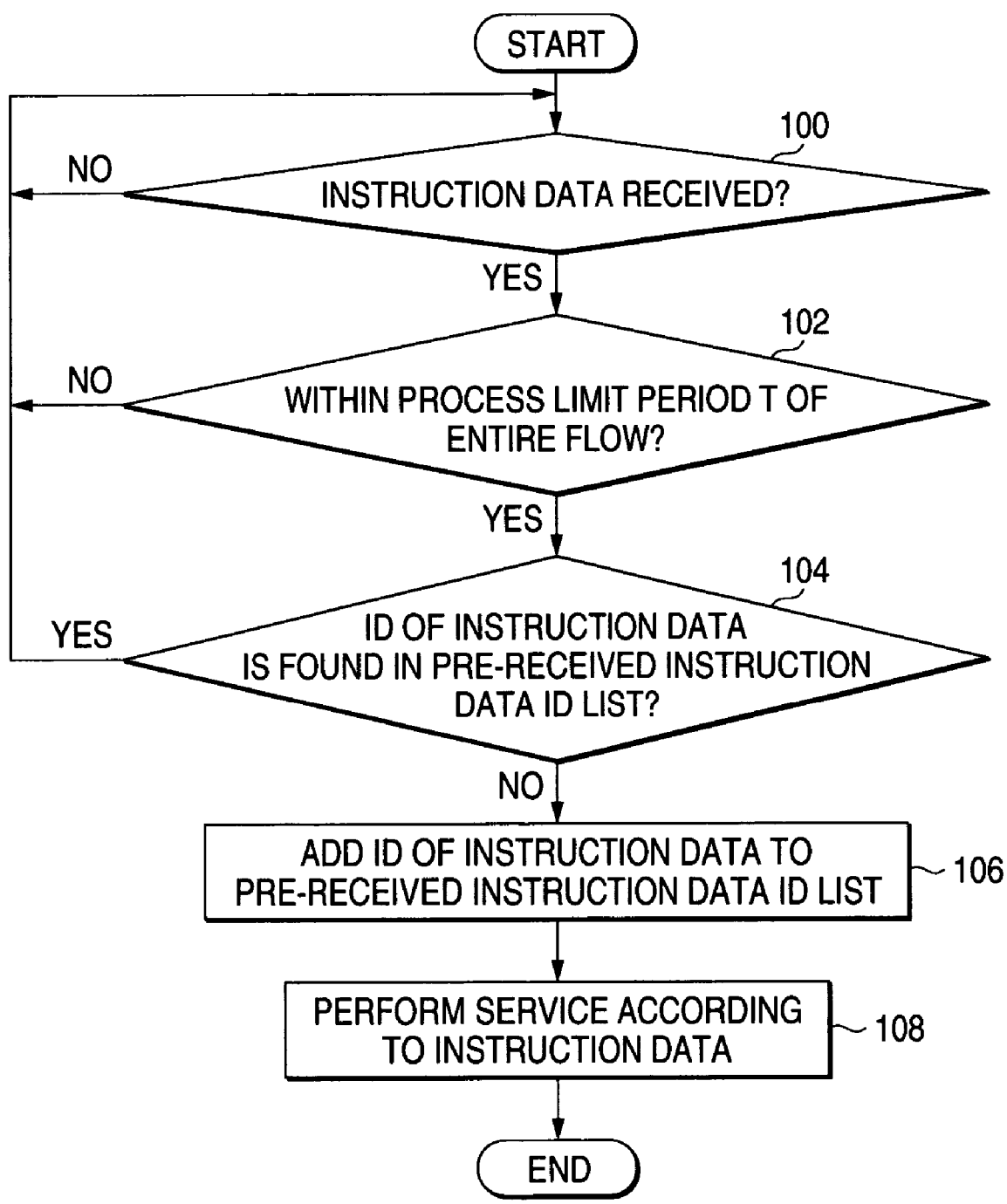
FIG. 4 is a flowchart of an instruction data reception processing routine.

FIG. 4 is a flowchart of an instruction data reception processing routine.

At step 100, it is judged whether instruction data has been received. If it is judged that instruction data has been received, it is judged at step 102 whether an elapsed time from a flow start time $t_0$ contained in the received instruction data to the present time is within a process limit period T of the entire flow also contained in the instruction data. If it is judged that the elapsed time is longer than the process limit period T of the entire flow, no processing is performed for the instruction data and the routine returns to step 100. If it is judged that the elapsed time is within the process limit period T of the entire flow, it is judged at step 104 whether the ID of the instruction data is found in a pre-received instruction data ID list. If the ID of the instruction data is found in the pre-received instruction data ID list, which means that the received instruction data is the same as the one that was received previously, no processing is performed for the instruction data and the routine returns to step 100.

Steps 102 and 104 are provided in view of the fact that a general packet communication or the like has a communication procedure in which instruction data is transmitted several times repeatedly until the communication is regarded as successful. Steps 102 and 104 prevent double arrival of instruction data.

At step 106, the ID of the received instruction data is added to the pre-received instruction data ID list.

Each ID in the pre-received instruction data ID list is deleted automatically when the process limit period T of the entire flow of instruction data corresponding to the ID has elapsed.

At step 108, a service is performed according to the received instruction data. More specifically, a service that is described in the instruction data is performed by the service processing section 56 that is controlled by the control section 50.

Figure 5:
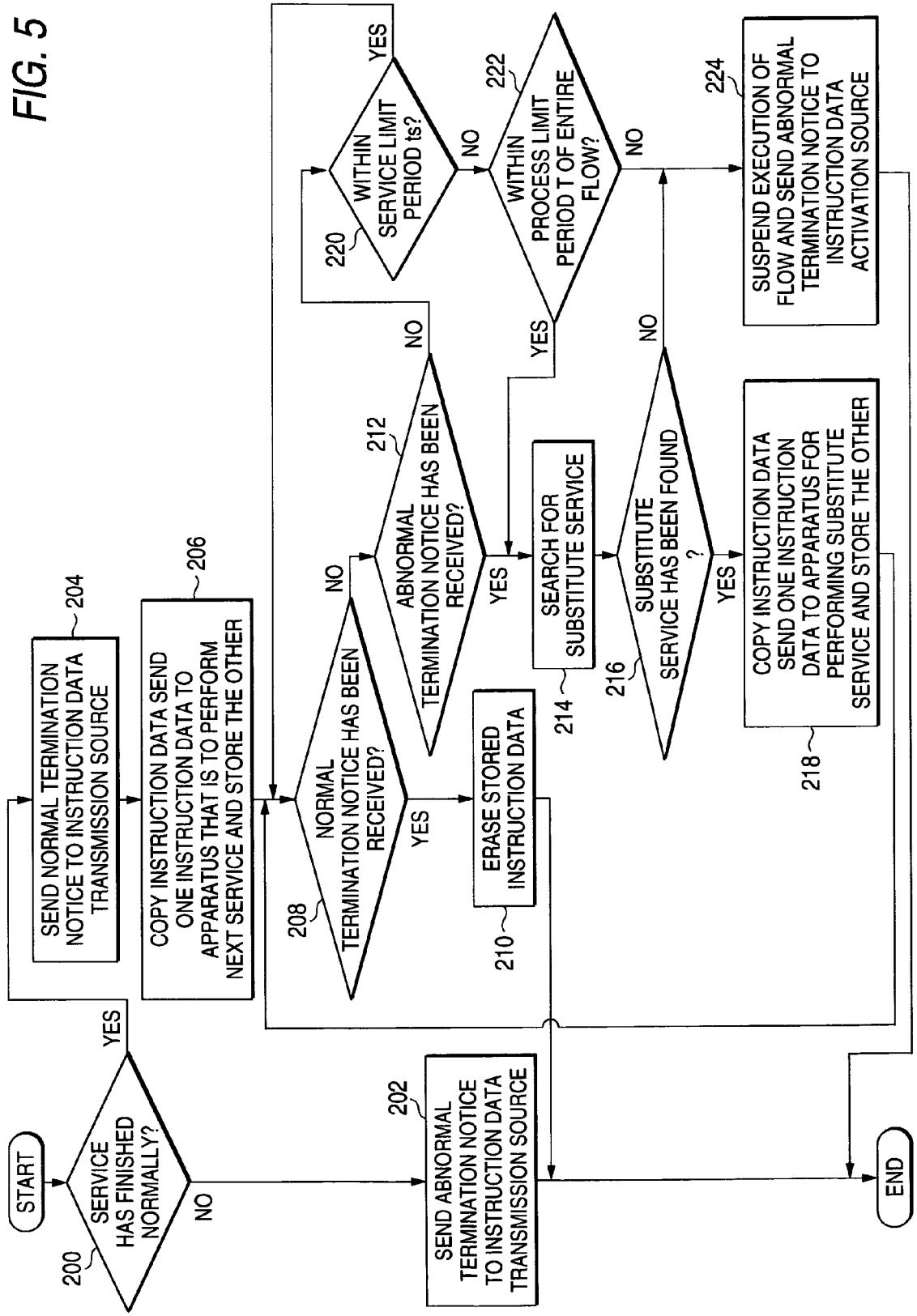
FIG. 5 is a flowchart of an instruction data transmission routine.

FIG. 5 is a flowchart of an instruction data transmission processing routine that is executed by each service processing apparatus after completion of a service.

At step 200, it is judged whether a service that has been performed by the service processing section 56 has finished normally. If it is judged that the service has finished abnormally, at step 202 an abnormal termination notice is sent to a transmission source of the instruction data, that is, a service processing apparatus that performed a service that precedes the service that has been performed by the service processing apparatus concerned. The routine is finished thereafter.

If it is judged at step 200 that the service has finished normally, at step 204 a normal termination notice is sent to the instruction data transmission source.

At step 206, the instruction data is copied. One instruction data is sent to a service processing apparatus that is to perform a next service on the basis of information contained in the instruction data and indicating cooperative relationships between services. The other instruction data is stored in the first memory 58. Document data that has been processed in the service of the service processing section 56 is also copied. Like the instruction data, one document data is sent to the service processing apparatus that is to perform the next service and the other is stored in the first memory 58.

At step 208, it is judged whether a normal termination notice has been received from the service processing apparatus as the instruction data transmission destination for the service that is supposed to be performed by that service processing apparatus. If it is judged that a normal termination notice has been received, at step 210 the instruction data and the document data stored in the first memory 58 are erased.

If it is judged at step 208 that no normal termination notice has been received, it is judged at step 212 whether an abnormal termination notice has been received from the service processing apparatus as the instruction data transmission destination for the service that is supposed to be performed by that service processing apparatus. If it is judged that an abnormal termination notice has been received, at step 214 a service (hereinafter referred to as "substitute service") capable of replacing the next service is searched for.

More specifically, the control section 50 sends a search request to the service search server 40. Upon receiving the search request, the service search server 40 searches the service storage section 74 for a substitute service. If a substitute service is retrieved from the service storage section 74, the service search server 40 sends, as a search result, information relating to the retrieved substitute service (e.g., position information of a service processing apparatus for performing the retrieved substitute service) to the search request source service processing apparatus. If no substitute service has been retrieved, the service search server 40 sends, as a search result, a notice to that effect to the search request source service processing apparatus.

At step 216, it is judged, on the basis of a search result received from the service search server 40, whether a substitute service exists. If it is judged that a substitute service exists, at step 218 the instruction data and the document data that are stored in the first memory 58 are copied. One combination of instruction data and document data is sent to the service processing apparatus for performing the substitute service and the other is stored in the first memory 58. Then, the routine returns to step 208 to again execute, for the substitute service, the same steps as described above.

If the judgment result at step 216 is negative, the routine goes to step 224, where execution of the flow of the instruction data is suspended and an abnormal termination notice of the flow is sent to the instruction data activation source.

If it is judge at step 212 that no abnormal termination notice has been received, it is judged at step 220 whether the elapsed time from the transmission of the instruction data to the present time is within a service limit period $t_s$. The term "service limit period $t_s$" as used herein means a service limit period $t_s$ of the next service or the substitute service. If it is judged at step 220 that the elapsed time is within the service limit period $t_s$, the routine returns to step 208 to again execute the same steps as described above.

If it is judged at step 220 that the elapsed time is not within the service limit period $t_s$, it is judged at step 222 whether the elapsed time from a flow start time $t_0$ contained in the instruction data to the present time is within a process limit period T of the entire flow of the instruction data. If it is judged that the elapsed time is within the process limit period T of the entire flow, the routine goes to step 214.

If it is judged at step 222 that the elapsed time is longer than the process limit period T of the entire flow, at step 224 the execution of the flow of the instruction data is suspended and a notice to the effect that the flow of the instruction data has finished abnormally is sent to the instruction data activation source.

If there exist plural substitute services, the service search server 40 may select an arbitrary one of them. As long as the elapsed time is within the process limit period T of the entire flow, the service processing apparatus repeatedly supplies a search request to the service search server 40 and repeatedly sends the instruction data and the document data as the subject of processing to a service processing apparatus for performing a substitute service other than retrieved ones until a substitute service normal termination notice is received (steps 208-222).

In this embodiment, in searching for a substitute service, a service processing apparatus acquires a search result from the service search server 40. Alternatively, a service processing apparatus itself may search for a substitute service by acquiring information relating to services that can be performed by the other service processing apparatus that are distributed via the network 12 by inquiring of the other service processing apparatus. This configuration can dispense with the service search server 40.

Next, various instruction data transmission process patterns will be described on the basis of the above-described instruction data reception processing routine and instruction data transmission processing routine.

Figure 6:
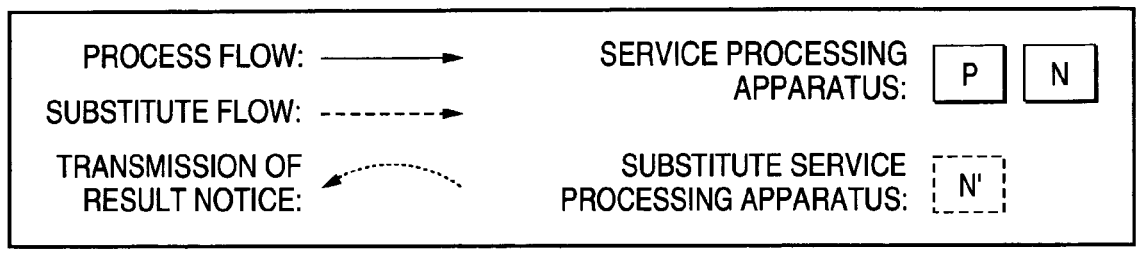
FIG. 6 shows symbols that are used in instruction data transmission process patterns shown in FIGS. 7-10.

Instruction data transmission process patterns shown in FIGS. 7-10 will be described by using symbols shown in FIG. 6. Description of document data as a subject of processing will be omitted.

Figure 7:
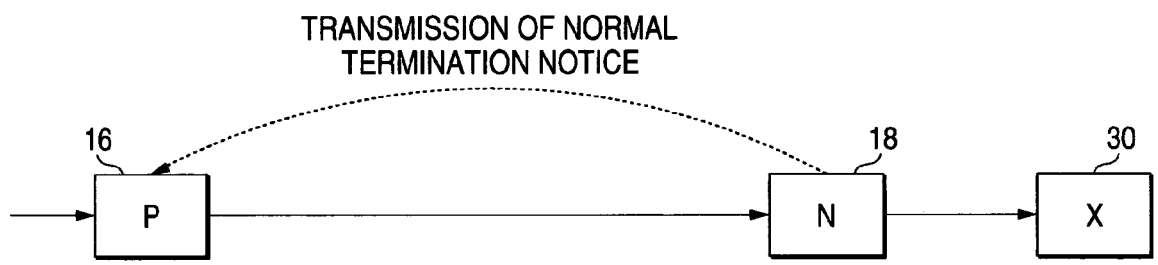
FIG. 7 shows an instruction data transmission process pattern in which a transmission source and destination of instruction data are in a one-to-one relationship, no obstacle is encountered during execution of a cooperative process, and instruction data is transmitted in order.

FIG. 7 shows an instruction data transmission process pattern in which a transmission source and destination of instruction data are in a one-to-one relationship, no obstacle is encountered during execution of a cooperative process, and instruction data is transmitted in order. After performing a service, the service processing apparatus P/16 copies instruction data. The service processing apparatus P/16 then sends one instruction data to the service processing apparatus N/18 that is to perform a next service and stores the other (step 206 in FIG. 5). Upon receiving a normal termination notice of the next service from the service processing apparatus N/18 ("Y" at step 208 in FIG. 5), the service processing apparatus P/16 erases the stored instruction data (step 210 in FIG. 5). After receiving the instruction data, the service processing apparatus N/18 performs the same process as the service processing apparatus P/16 did.

Figure 8:
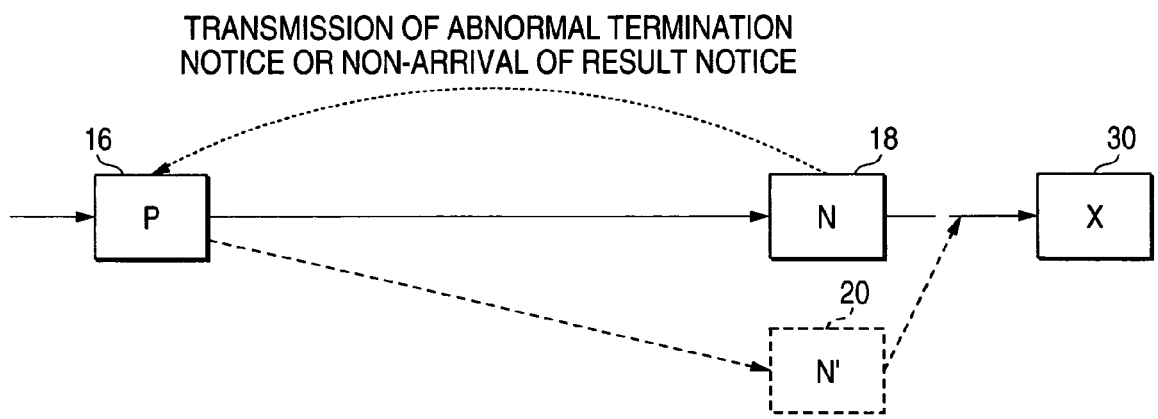
FIG. 8 shows an instruction data transmission process pattern in which a transmission source and destination of instruction data are in a one-to-one relationship and an obstacle is encountered during execution of a cooperative process.

FIG. 8 shows an instruction data transmission process pattern in which a transmission source and destination of instruction data are in a one-to-one relationship and an obstacle is encountered during execution of a cooperative process.

An obstacle is encountered in the following three patterns:

1) An obstacle exists between the service processing apparatus P/16 and the service processing apparatus N/18 (e.g., on a communication channel) and instruction data itself does not reach the service processing apparatus N/18. (In this case, a processing result notice of the service of the service processing apparatus N/18 does not reach the service processing apparatus P/16 within the service limit period $t_s$ ("N" at step 220 in FIG. 5)).

2) The execution of the service in the service processing apparatus N/18 fails (occurrence of an abnormal termination) and the service in the service processing apparatus N/18 sends an abnormal termination notice to the service processing apparatus P/16 ("Y" at step 212 in FIG. 5).

3) A processing result notice (normal termination notice or abnormal termination notice) that is supposed to be sent from the service processing apparatus N/18 to the service processing apparatus P/16 does not reach the service processing apparatus P/16 within the service limit period $t_s$ ("N" at step 220 in FIG. 5).

If an obstacle is encountered in one of the above patterns, the service processing apparatus P/16 considers that the execution of the service in the service processing apparatus N/18 has failed. If the elapsed time from the flow start time $t_0$ to the present time is within the process limit period T of the entire flow, the service processing apparatus P/16 searches for and finds a service (i.e., substitute service) capable of replacing the service that is supposed to be performed by the service processing apparatus N/18 (step 214 and "Y" at step 216 in FIG. 5) and sends the stored instruction data to the service processing apparatus N'/20 for performing the substitute service (step 218 in FIG. 5). If a normal termination notice is received from the service processing apparatus N'/20 ("Y" at step 208 in FIG. 5), the service processing apparatus P/16 erases the stored instruction data (step 210 in FIG. 5).

If no substitute service has been performed successfully by a service processing apparatus (i.e., no substitute service has been found or all service processing apparatus for performing substitute services have failed in performing the substitute services; "N" at step 216 or 222 in FIG. 5) or if the elapsed time from the flow start time $t_o$ has exceeded the process limit period T of the entire flow ("N" at step 222 in FIG. 5), the service processing apparatus P/16 suspends the cooperative process and sends a notice to that effect to the instruction data activation source (not shown) (step 224 in FIG. 5).

Figure 9:
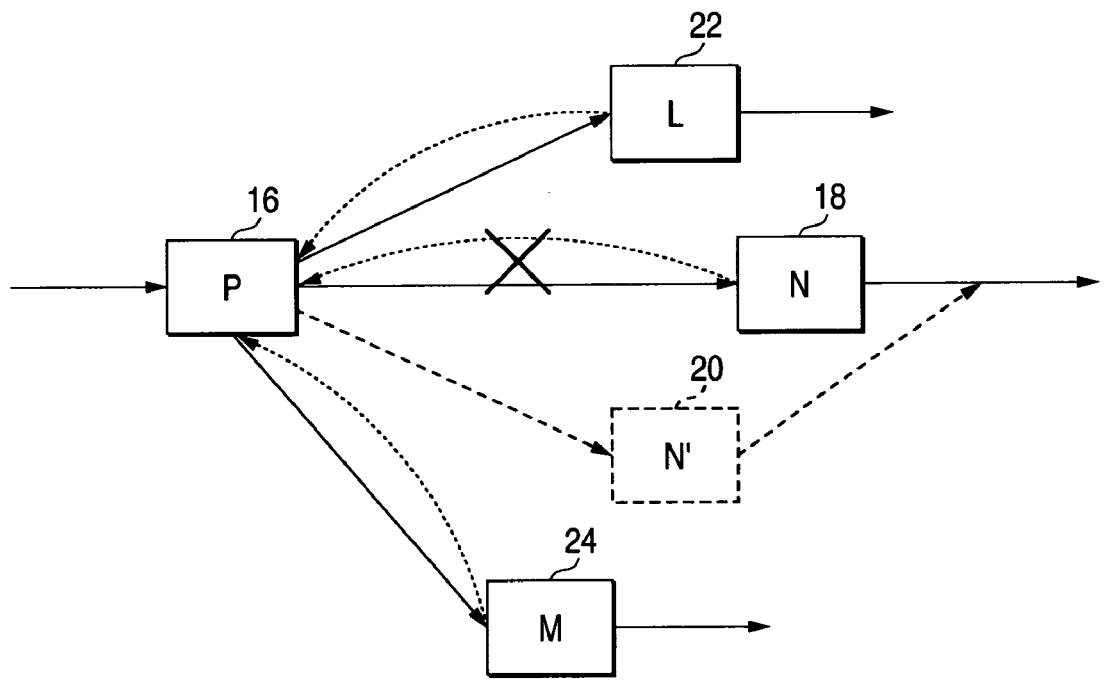
FIG. 9 shows an instruction data transmission process pattern in which a transmission source and transmission destinations of instruction data are in a one-to-plurality relationship and a flow has branches.

FIG. 9 shows an instruction data transmission process pattern in which a transmission source and transmission destinations of instruction data are in a one-to-plurality relationship and a flow has branches.

In this case, instruction data is copied at a branching point (i.e., service processing apparatus P/16) and resulting instruction data that are the same in number as the branches are sent to branch destinations (i.e., service processing apparatus L/22, N/18, and M/24) (step 206 in FIG. 5). This branching process is described in the instruction data in advance.

The service processing apparatus P/16 at the branching point keeps the instruction data stored until services (part of which may be substitute services) are completed normally in the service processing apparatus L/22, N/18, and M/24 as the branch destinations.

If an obstacle is encountered in one (e.g., the service processing apparatus N/18 shown in FIG. 9) of the branch destination service processing apparatus L/22, N/18, and M/24 ("Y" at step 212 or "N" at step 220 in FIG. 5), a service processing apparatus for performing a substitute service is searched for and the service processing apparatus N'/20 is found as such an apparatus (step 214 and "Y" at step 216 in FIG. 5) and the stored instruction data is sent to it (step 218 in FIG. 5) in the same manner as in the above-described case that a transmission source and destination are in a one-to-one relationship. If normal termination notices have been received from all the branch destinations including the service processing apparatus N'/20 ("Y" at step 208 in FIG. 5), the instruction data stored in the service processing apparatus P/16 is erased (step 210 in FIG. 5).

Alternatively, where a flow has branches as in the above-described case, the service processing apparatus P/16 at the branching point may, for example, decompose received instruction data into instruction data that are optimized for the respective branch destination service processing apparatus L/22, M/24, and N/18 and send the optimized instruction data to the respective branch destination service processing apparatus L/22, M/24, and N/18 rather than merely copies the instruction data. Each optimized instruction data may contain such information as service information that is necessary in the associated branch destination, information indicating occurrence of branching, branching conditions, and outlines of the other branches and times allowed to be consumed there.

Figure 10:
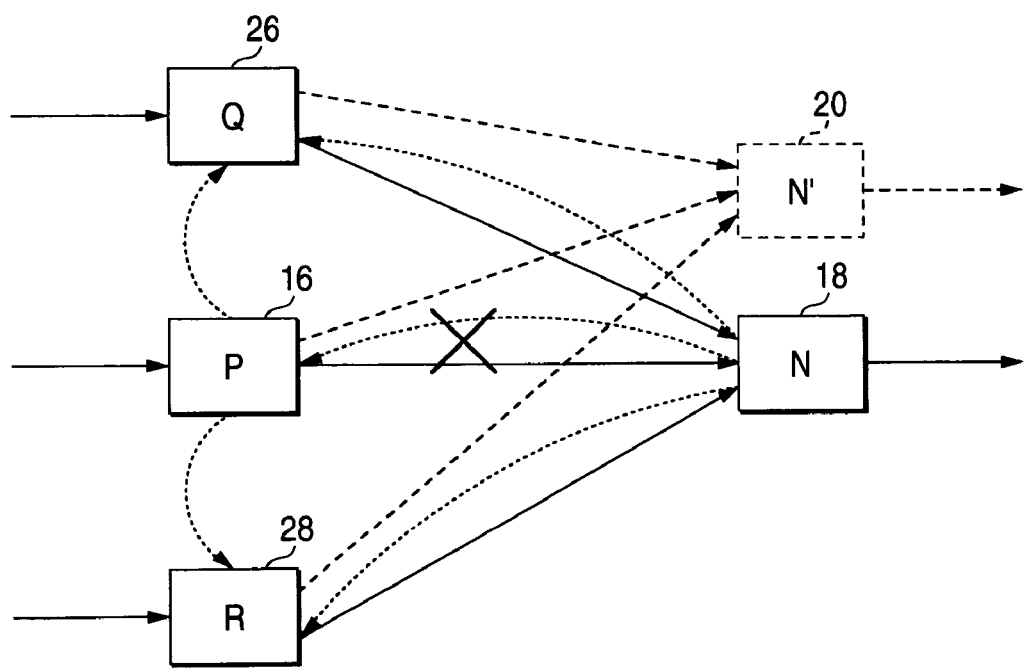
FIG. 10 shows an instruction data transmission process pattern in which transmission sources and a transmission destination of instruction data are in a plurality-to-one relationship and branches of a flow merge together.

FIG. 10 shows an instruction data transmission process pattern in which transmission sources and a transmission destination are in a plurality-to-one relationship and branches of a flow merge together.

If no obstacle is encountered, each of the service processing apparatus P/16, Q/26, and R/28 at each branch end and the service processing apparatus N/18 at a merging point cooperate with each other in the same manner as in the above-described case that a transmission source and destination have a one-to-one relationship. The service processing apparatus P/16, Q/26, and R/28 keep instruction data stored until the branches of the flow merge together, that is, all the branch end service processing apparatus P/16, Q/26, and R/28 receive a normal termination notice from the service processing apparatus N/18.

If a certain obstacle is encountered, for example, if one or more branches of the branch end service processing apparatus P/16, Q/26, and R/28 cannot merge together at the merging point service processing apparatus N/18 or a service has failed in the service processing apparatus N/18 though all the branches have merged together successfully ("Y" at step 212 or "N" at step 220 in FIG. 5), the following exemplary processing is performed.

One of the service processing apparatus P/16, Q/26, and R/28 in which the service limit period $t_s$ of a next service has been reached earliest (in FIG. 10, the service processing apparatus P/16) searches for a substitute service capable of replacing the service of the service processing apparatus N/18 and finds that the service processing apparatus N'/20 is a service processing apparatus for performing such a service ("Y" at step 216 in FIG. 5) and sends stored instruction data to the service processing apparatus N'/20 (step 218 in FIG. 5). At the same time, the service processing apparatus P/16 requests the other branch end service processing apparatus Q/26 and R/28 to send stored instruction data to the service processing apparatus N'/20. Receiving those requests, the service processing apparatus Q/26 and R/28 send the stored instruction data to the service processing apparatus N'/20. A branch end service processing apparatus may judge that itself is a service processing apparatus in which the service limit period $t_s$ of a next service has been reached earliest if no notices have been received from the other branch end service processing apparatus at the instant when the service limit period $t_s$ is reached. Then, that branch end service processing apparatus searches for a substitute service.

As described above, even in cases that a flow branches or branches of a flow merge together, a cooperative process and an obstacle handling process can be performed smoothly in the above-described manner.

Next, an exemplary cooperative process that is executed interactively by service processing apparatus for performing respective services will be described by using specific services. In this example, instruction data that describes a flow (hereinafter referred to as "application-for-examination flow") for applying for a certain examination is transmitted. An applicant 80 applies for an examination by an examiner 88 as the flow that is described in the instruction data is executed.

Figure 11:
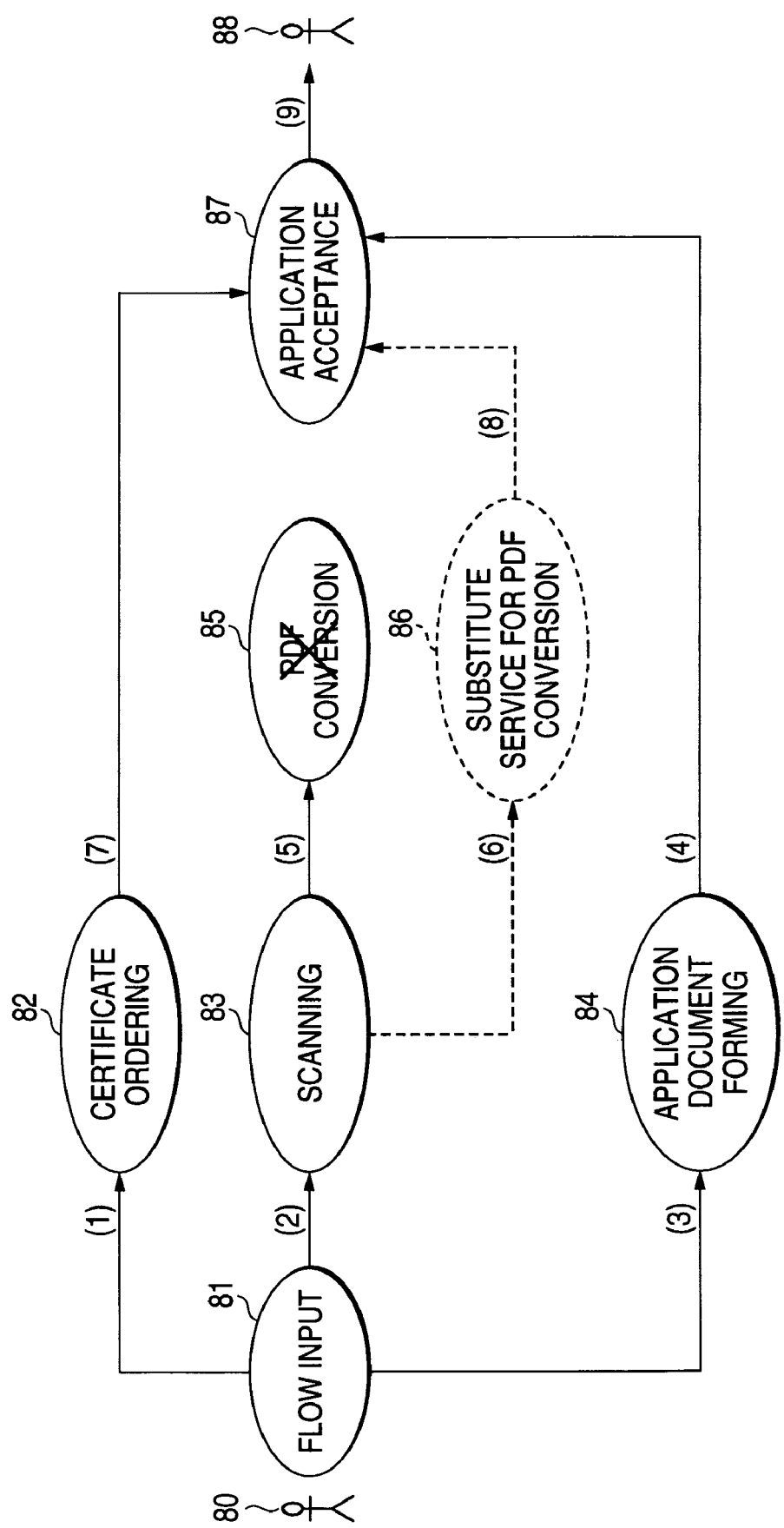
FIG. 11 shows an exemplary cooperative process including services that constitute an application-for-examination flow and includes an instruction data transmission process pattern in which a transmission source and destination of instruction data are in a one-to-one relationship and an obstacle is encountered during execution of the cooperative process.

FIG. 11 illustrates how services that constitute an application-for-examination flow cooperate with each other.

The application-for-examination flow includes a flow input service 81, a certificate ordering service 82, a scanning service 83, an application document forming service 84, a PDF conversion service 85, and an application acceptance service 87.

The flow input service 81 is a service that produces three copies of instruction data that describes an application-for-examination flow and sends those to service processing apparatus for performing the certificate ordering service 82, the scanning service 83, the application document forming service 84, respectively, when the instruction data is selected and an cooperative process is activated.

The certificate ordering service 82 is a service for ordering a certificate that is necessary for an examination.

The scanning service 83 is a service for scanning a document to be attached to a certificate.

The application document forming service 84 is a service for inputting data to be entered in an application-for-examination document.

The PDF conversion service 85 is a service for converting scanned-in data into PDF-format data.

The application acceptance service 87 is a service for receiving various document data that are necessary for an application for examination, accepting the application from the applicant 80, and informs the examiner 88 of the acceptance of the application.

Figure 12:
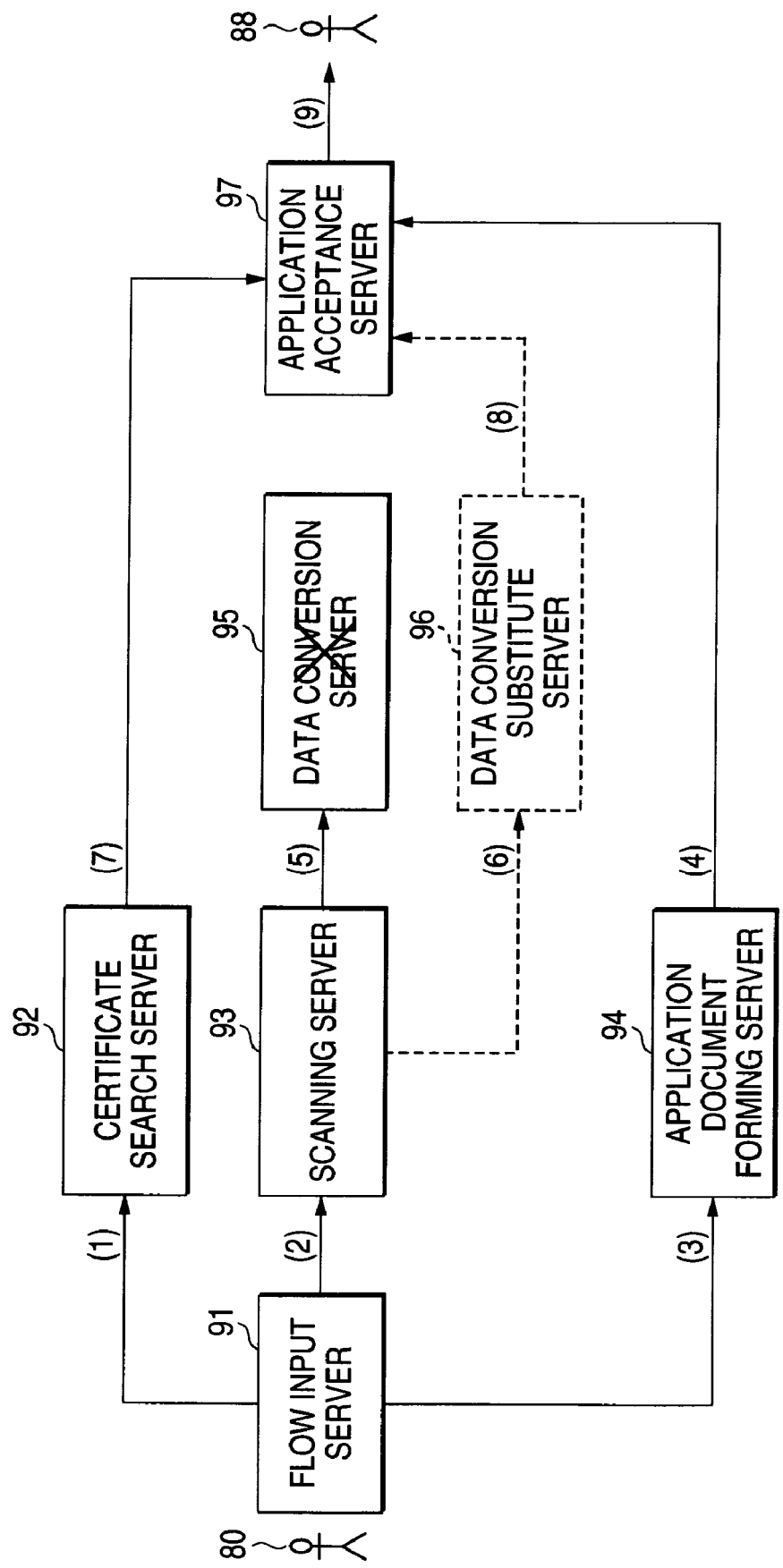
FIG. 12 shows service processing apparatus for performing respective services shown in FIG. 11.

FIG. 12 show service processing apparatus for performing the respective services shown in FIG. 11.

A flow input server 91, a certificate search server 92, a scanning server 93, an application document forming server 94, a data conversion server 95, and an application acceptance server 97 perform the flow input service 81, the certificate ordering service 82, the scanning service 83, the application document forming service 84, the PDF conversion service 85, and the application acceptance service 87, respectively. The configuration of each of the service processing apparatus 91-97 and the details of a cooperative processing routine are the same as the configuration of the service processing apparatus P/16 and the details of the above described cooperative processing routine, respectively, and hence will not be described below. The service processing apparatus 91-97 are connected to each other via a network.

Next, a specific cooperative process will be described.

First, in the flow input server 91, an instruction data that describes an application-for-examination flow is selected by an applicant 80 through the GUI 52. The flow input service 81 is started at a flow start time $t_0$. Three copies of the instruction data are produced and sent parallel to the certificate search server 92 for performing the certificate ordering service 82, the scanning server 93 for performing the scanning service 83, and the application document forming server 94 for performing the application document forming service 84 (indicated by symbols (1), (2), and (3)).

Upon receiving the instruction data, the certificate search server 92 performs the certificate ordering service 82. Specifically, the service processing section 56 of the certificate search server 92 searches for and orders various certificates via the network. The certificate search server 92 sends, together with the instruction data, received certificates to the application acceptance server 97 that is to perform the next service described in the instruction data, that is, the application acceptance service 87 (indicated by symbol (7)).

Upon receiving the instruction data, the scanning server 93 performs the scanning service 83. Specifically, the service processing section 56 of the scanning server 93 scans documents to be attached to the certificates. The scanning server 93 sends, together with the instruction data, scanned-in data to the data conversion server 95 that is to perform the next service described in the instruction data, that is, the PDF conversion service 85 (indicated by symbol (5)).

Upon receiving the instruction data, the application document forming server 94 performs the application document forming service 84. Specifically, the service processing section 56 of the application document forming server 94 forms an application document by inputting, for items of an application-for-examination document having an electronic format, examination formality data that are stored in a prescribed storage area in advance and data relating to the applicant 80. The application document forming server 94 sends, together with the instruction data, an application document thus formed to the application acceptance server 97 for performing the next service described in the instruction data, that is, the application acceptance service 87 (indicated by symbol (4)). Alternatively, the application document forming service 84 may be such that, instead of using data stored in advance, a list of items to be input to an application document is displayed on the GUI 52 and a user inputs data for those items.

Upon receiving the instruction data and the scanned-in data from the scanning server 83, the data conversion server 95 performs the PDF conversion service 85.

If a certain obstacle is encountered and hence the PDF conversion service 85 does not function properly, the scanning server 83 searches for a substitute service for the PDF conversion service 85, finds the substitute service 86, and sends the stored instruction data and the scanned-in data to the server (i.e., data conversion substitute server 96) for performing the substitute service 86 (indicated by symbol (6)).

Upon receiving the instruction data and the scanned-in data, the data conversion substitute server 96 performs the substitute service 86 that is equivalent to the PDF conversion service 85. That is, the service processing section 56 of the data conversion substitute server 96 converts the data sent from the scanning server 83 into PDF-format data, and sends, together with the instruction data, the PDF-format data to the application acceptance server 97 for performing the application acceptance service 87 (indicated by symbol (8)).

This process corresponds to the above-described instruction data transmission process pattern in which a transmission source and destination of instruction data are in a one-to-one relationship and an obstacle is encountered during execution of a cooperative process.

The application acceptance server 97 performs the application acceptance service 87 and waits for transmission of the instruction data and the document data of the various certificates, the attachment documents, the application document, etc. from the service processing apparatus for performing all of the certificate ordering service 82, the PDF conversion service 85, and the application document forming service 84 (or substitute services thereof). Upon receiving the three instruction data and the various document data, the application acceptance server 97 sends an application notice to the examiner 88 (indicated by symbol (9)).

As described above, a cooperative process is not suspended even if an obstacle is encountered during its execution. Instruction data can be transmitted with high reliability.

Figure 13:
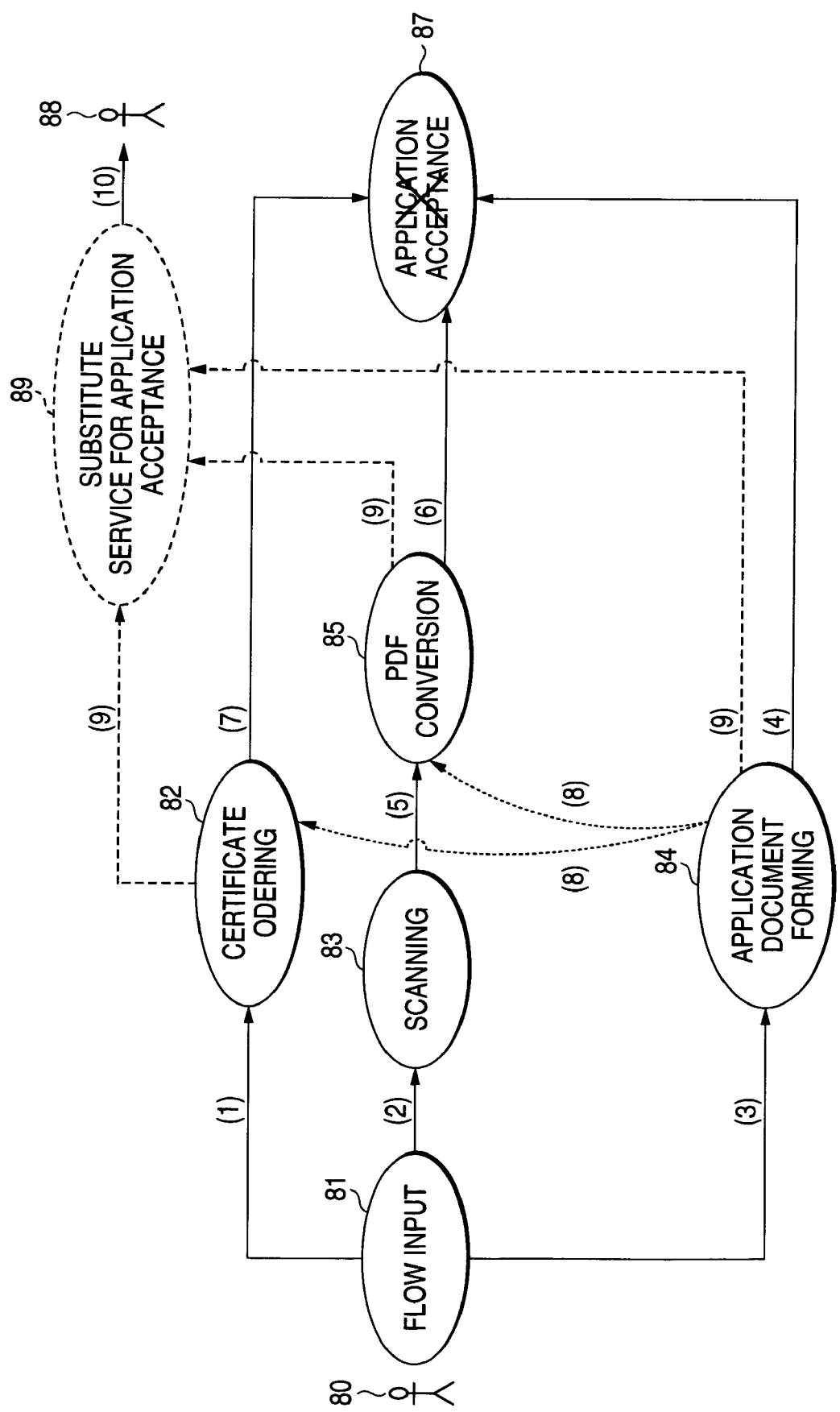
FIG. 13 shows an exemplary cooperative process including services that constitute an application-for-examination flow and includes an instruction data transmission process pattern in which transmission sources and a transmission destination of instruction data are in a plurality-to-one relationship and an obstacle is encountered at a merging point of branches of the flow.
Figure 14:
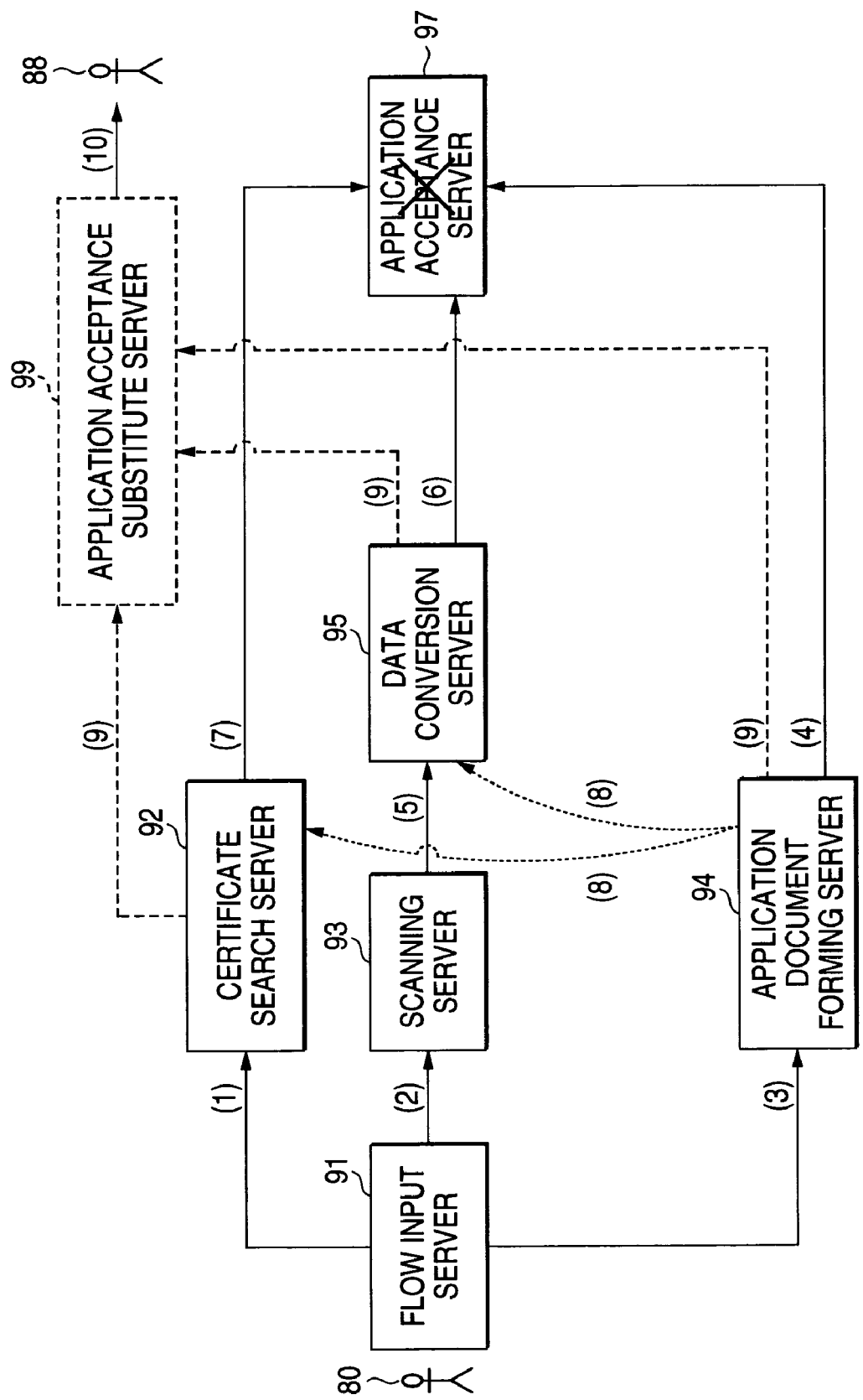
FIG. 14 shows service processing apparatus for performing respective services shown in FIG. 13.

Next, a process that is executed when an obstacle is encountered in the application acceptance server 97 for performing the application acceptance service 87 of the above application-for-examination flow will be described with reference to FIGS. 13 and 14.

If no obstacle is encountered, the application acceptance server 97 should receive the instruction data and document data of various certificates, attachment documents, an application document, etc. (indicated by symbols (4), (6), and (7)) from the certificate search server 92, the application document forming server 94, and the data conversion server 95. If, for example, the application acceptance server 97 stops operating during the course of reception of the instruction data and the document data from the service processing apparatus 92, 94, and 95, one of the certificate search server 92, the application document forming server 94, and the data conversion server 95 in which the elapsed time from the instant of sending of the instruction data has reached the service limit period $t_s$ of the application acceptance service 87 earliest, in this example, the application document forming server 94, searches for a substitute service for the application acceptance service 87 and finds an application acceptance substitute service 89. The application document forming server 94 sends the stored instruction data and the application document to a server (i.e., application acceptance substitute server 99) for performing the application acceptance substitute service 89 (indicated by symbol (9)).

At the same time, the application document forming server 94 sends, to the application document search server 92 and the data conversion server 95, a notice to the effect that the instruction data transmission destination has been changed to the application acceptance substitute server 99 for performing the substitute service 89 for the application acceptance service 87 (indicated by symbol (8)). Upon receiving this notice, the application document search server 92 and the data conversion server 95 send the stored instruction data and the document data to the application acceptance substitute server 99 (indicated by symbol (9)). Upon receiving the three instruction data and the various document data, the application acceptance substitute server 99 performs the substitute service 89 for the application acceptance service 87.

This process corresponds to an instruction data transmission process pattern in which transmission sources and a transmission destination are in a plurality-to-one relationship and branches of a flow merge together.

As described above, a cooperative process is not suspended even if an obstacle is encountered during its execution. Instruction data can be transmitted with high reliability.

As described above, each service processing apparatus does not merely send instruction data. Instead, each service processing apparatus copies the instruction data, and sends one instruction data to a service processing apparatus that is to perform a next service and stores the other. If an obstacle is encountered in the service processing apparatus for performing the next service, the service processing apparatus as the instruction data transmission source sends the stored instruction data to a service processing apparatus for performing a substitute service. Therefore, even if an obstacle is encountered during execution of a cooperative process, instruction data does not disappear and hence the probability of suspension of the cooperative process is low. Further, even where a flow has branches or branches of a flow merge together, a cooperative process and an obstacle handling process can be performed smoothly by virtue of the above-described measures.

In the above embodiment, document data as a subject of processing is transmitted together with instruction data. However, another configuration is possible in which common document data as a subject of processing is stored in a storage device that can be accessed by plural service processing apparatus via a network and position information of the storage device in which document data is stored is transmitted so as to be attached to instruction data or incorporated in instruction data.

The cooperative processing apparatus according to the invention may be a cooperative processing apparatus having essential features of the invention and is not limited to the service processing apparatus according to the above embodiment.

In the cooperative processing apparatus and the cooperative processing method according to the invention, each cooperative processing apparatus not only transmits cooperation information but also copies the cooperation information and sends one cooperation information to a cooperative processing apparatus that is to perform a next service. If it is judged that an obstacle exists in the cooperative processing apparatus for performing the next service, the cooperative processing apparatus as the instruction data transmission source sends the other cooperation information to a cooperative processing apparatus for performing a substitute service. This provides an advantage that cooperation information can be transmitted with high reliability and hence the probability of suspension of cooperative services can be lowered.

The entire disclosure of Japanese Patent Application No. 2003-081196 filed on Mar. 24, 2003 including specification, claims, drawings and abstract is incorporated herein by reference in its entirety.

What is claimed is:

1. A cooperative processing apparatus comprising:
 a sending and receiving unit that sends and receives cooperation information in which a flow of services are described, the flow of services are to be performed on document data by a plurality of cooperative processing apparatuses in a cooperative manner and a processing result of a service to and from other cooperative processing apparatus;

a service processing unit that performs a service according to the cooperation information; and a control unit for performing:
- a first control of controlling, when receiving cooperation information, the service processing unit to perform the service according to the cooperation information;
- a second control of sending back, to a cooperative processing apparatus which has sent the cooperation information, a processing result indicating whether the service processing unit has performed the service normally or abnormally, and, if the service processing unit has performed the service normally, copying the cooperation information and controlling the sending and receiving unit so that it sends a copy of the cooperation information to a next cooperative processing apparatus that is to perform a next service according to the cooperation information; and
- a third control of controlling the sending and receiving unit so that if an abnormality occurs in the next cooperative processing apparatus after the next cooperative processing apparatus receives the cooperation information, the sending and receiving unit sends a copy of the cooperation information to a substitute cooperative processing apparatus capable of performing a substitute service for the next service.

2. The cooperative processing apparatus according to claim 1, wherein the third control is configured to determine that an abnormality has occurred in the next cooperative processing apparatus if:
- a processing result of the next service received from the next cooperative processing apparatus for performing the next service indicates occurrence of an abnormality, or
- if no processing result of the next service is received in a prescribed period of time from the next cooperative processing apparatus for performing the next service.

3. The cooperative processing apparatus according to claim 1, wherein the third control is configured to suspend the flow and control the sending and receiving unit so that it sends a processing result indicating occurrence of an abnormality to a cooperative processing apparatus that sent the cooperative information first if no processing result of the next service or the substitute service for the next service is received within a predetermined processing period of time or if there exists no cooperative processing apparatus capable of performing a substitute service for the next service.

4. A cooperative processing method comprising:
- a first control step of controlling a service processing unit for performing a service to perform the prescribed service according to the cooperation information when the cooperation information is received by a sending and receiving unit for sending and receiving cooperation information in which a prescribed flow of services are described, the flow of services are to be performed on document data by a plurality of cooperative processing apparatuses in a cooperative manner and a processing result of a service to and from other cooperative processing apparatus;
- a second control step of sending back, to a cooperative processing apparatus which has sent the cooperation information, a processing result indicating whether the service processing unit has performed the service normally or abnormally, and, if the service processing unit has performed the service normally, copying the cooperation information and controlling the sending and receiving unit so that it sends a copy of the cooperation information to a next cooperative processing apparatus that is to perform a next service according to the cooperation information; and
- a third control step of controlling the sending and receiving unit so that if an abnormality occurs in the next cooperative processing apparatus after the next cooperative processing apparatus receives the cooperation information, the sending and receiving unit sends a copy of the cooperation information to a substitute cooperative processing apparatus capable of performing a substitute service for the next service.

5. The cooperative processing method according to claim 4, wherein the third control step judges that an abnormality has occurred in the next cooperative processing apparatus if:
- a processing result of the next service received from the next cooperative processing apparatus for performing the next service indicates occurrence of an abnormality, or
- if no processing result of the next service is received in a prescribed period of time from the next cooperative processing apparatus for performing the next service.

6. The cooperative processing method according to claim 4, wherein the third control step suspends the flow and controls the sending and receiving unit so that it sends a processing result indicating occurrence of an abnormality to a cooperative processing apparatus that sent the cooperative information first if no processing result of the next service or the substitute service for the next service is received within a predetermined processing period of time or if there exists no cooperative processing apparatus capable of performing a substitute service for the next service.

7. The cooperative processing apparatus according to claim 1, wherein the service processing unit retains a copy of the cooperation information, and if an abnormality occurs in the next cooperative processing apparatus, the sending and receiving unit retrieves from the service processing unit the retained cooperation information and sends the retained cooperation information to the substitute cooperative processing apparatus.

8. The cooperative processing method according to claim 4, further comprising:
- retaining a copy of the cooperation information at the service processing unit; and
- if an abnormality occurs in the next cooperative processing apparatus, retrieving a copy of the retained cooperation information and sending the retained cooperation information to the substitute cooperation processing apparatus.

9. The cooperative processing apparatus according to claim 7, wherein when a normal termination is received, the retained copy of the cooperation information is erased.

10. The cooperative processing method according to claim 8, further comprising erasing the retained copy of the cooperation information when a normal termination is received.

* * * * *